US008954688B2

(12) United States Patent
Oberhofer et al.

(10) Patent No.: US 8,954,688 B2
(45) Date of Patent: Feb. 10, 2015

(54) HANDLING STORAGE PAGES IN A DATABASE SYSTEM

(75) Inventors: Martin A. Oberhofer, Bondorf (DE); Jens Seifert, Gaertringen (DE)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 13/157,829

(22) Filed: Jun. 10, 2011

(65) Prior Publication Data

US 2012/0089791 A1 Apr. 12, 2012

(30) Foreign Application Priority Data

Oct. 6, 2010 (EP) .................................. 10186740

(51) Int. Cl.
*G06F 12/00* (2006.01)
*G06F 13/00* (2006.01)
*G06F 13/28* (2006.01)

(52) U.S. Cl.
CPC ..................................... *G06F 13/00* (2013.01)
USPC ........................................................ 711/154

(58) Field of Classification Search
CPC ......................................................... G06F 13/00
USPC ........................................... 711/154, E12.001
See application file for complete search history.

(56) References Cited

U.S. PATENT DOCUMENTS

| 5,537,635 | A | * | 7/1996 | Douglas ........................ 711/129 |
| 5,579,507 | A | * | 11/1996 | Hosouchi et al. ............. 711/171 |
| 5,983,368 | A | | 11/1999 | Noddings |
| 6,000,020 | A | | 12/1999 | Chin et al. |
| 6,336,120 | B1 | | 1/2002 | Noddings et al. |
| 6,523,102 | B1 | * | 2/2003 | Dye et al. ....................... 711/170 |
| 6,950,834 | B2 | * | 9/2005 | Huras et al. .................... 707/610 |
| 6,959,319 | B1 | * | 10/2005 | Huang et al. ................... 709/203 |
| 7,599,949 | B1 | * | 10/2009 | Plasek et al. ........................... 1/1 |
| 2003/0005233 | A1 | * | 1/2003 | Stewart et al. ................. 711/136 |
| 2003/0163457 | A1 | * | 8/2003 | Yano et al. .......................... 707/3 |
| 2005/0071560 | A1 | | 3/2005 | Bolik |

(Continued)

FOREIGN PATENT DOCUMENTS

WO 2007015266 A2 2/2007

OTHER PUBLICATIONS

Anonymous, "System and Method for Usage Aware Row Storage in Database Systems," ip.com Prior Art Database, Jul. 2010: pp. 1-4, <http://priorartdatabase.com/IPCOM/000197960>.

*Primary Examiner* — Sheng-Jen Tsai
(74) *Attorney, Agent, or Firm* — Patterson & Sheridan, LLP

(57) ABSTRACT

An operation is disclosed for handling storage pages in a database system. The database system may include a management component and a storage component. The storage component may include storage locations with different hierarchical levels. Each storage page of the storage pages may include a number of records. The operation may include copying a storage page from the storage component to a buffer pool controlled by the management component, monitoring which records of the storage page in the buffer pool are being accessed, and setting information indicating access for each record accessed. The operation may also include determining, based on the information indicating access, whether to split the storage page into at least two resulting storage pages. The operation may also include writing the at least two resulting storage pages to the storage component at storage locations, where the at least two resulting storage pages have different hierarchy levels.

20 Claims, 7 Drawing Sheets

(56) References Cited

U.S. PATENT DOCUMENTS

| | | |
|---|---|---|
| 2006/0200697 A1* | 9/2006 | Ito .................................... 714/6 |
| 2006/0294164 A1* | 12/2006 | Armangau et al. ........... 707/205 |
| 2008/0112011 A1* | 5/2008 | Inoue et al. .................. 358/1.17 |
| 2008/0154994 A1 | 6/2008 | Fischer et al. |
| 2008/0270687 A1* | 10/2008 | Szonye et al. ................ 711/113 |
| 2009/0043978 A1 | 2/2009 | Sawdon et al. |
| 2009/0150593 A1* | 6/2009 | Hamilton et al. ............. 711/101 |
| 2009/0192982 A1* | 7/2009 | Samuelson et al. ............... 707/3 |
| 2009/0210445 A1 | 8/2009 | Draese et al. |
| 2010/0115222 A1 | 5/2010 | Usami |
| 2010/0161569 A1* | 6/2010 | Schreter ........................ 707/696 |
| 2010/0191922 A1* | 7/2010 | Dickey et al. ................. 711/154 |
| 2010/0223243 A1* | 9/2010 | Huras et al. ................... 707/705 |
| 2011/0055272 A1* | 3/2011 | Ahmad et al. ................. 707/781 |
| 2011/0099205 A1* | 4/2011 | Shmueli et al. ............... 707/797 |
| 2011/0167230 A1* | 7/2011 | Quan et al. .................... 711/154 |
| 2011/0191523 A1* | 8/2011 | Caulkins ....................... 711/103 |
| 2011/0202735 A1* | 8/2011 | Kono et al. .................... 711/162 |
| 2011/0231458 A1* | 9/2011 | Sutoh et al. .................... 707/827 |
| 2012/0239859 A1* | 9/2012 | Lary et al. ..................... 711/103 |
| 2012/0254579 A1* | 10/2012 | Schroeder et al. ............ 711/171 |

* cited by examiner

HANDLING STORAGE PAGES IN A DATABASE SYSTEM

CROSS-REFERENCE TO RELATED APPLICATIONS

This patent application claims priority under 35 U.S.C. §119 to European Patent Application No. 10186740.6 filed Oct. 6, 2010 by Martin Oberhofer and Jens Seifert, titled, "Method for Handling Storage Pages in a Database System," which is herein incorporated by reference in its entirety.

BACKGROUND OF THE INVENTION

Today, the amount of data processed by database systems grows at an accelerating pace. In parallel, the demand for faster processing results on this growing amount of data is going up, which essentially means that users expect quicker results on larger amounts of data.

Increase in data volume means an increase in storage, driving up storage costs as well as operational costs due to higher power usage—today, electricity is the largest cost item in a data center. The costs for electricity increase with the speed of hard disks used (and the hard disk price also increases with higher speed). Companies may struggle with the rising costs of their data centers.

However, enterprises understand that—even though the data volume is growing—the speed for access to the data is not uniform across the data. This means that data may be classified according to an "age," based on access demands:

Type 1: A portion of the data may often be needed by quickly accessing it to satisfy the performance demands. Typically, this is the case with frequently accessed data and may often be new data.

Type 2: A portion of the data may be needed less frequently whereby also the speed of access does not need to be as quick. Typically, this portion may rarely be accessed and may often be older data.

Thus, companies may like to optimize their storage costs by still complying with performance demands by placing the first type of data on the fastest, most expensive disks with higher electricity consumption and thus higher operational costs, while placing the second type of data onto slower hard disks, which are less expensive to purchase and operate. The concept of a storage architecture with different layers of storage capacities with different performance characteristics and operational costs is known as hierarchical storage management (HSM).

Furthermore, many types of data instances are aging: For example, an order which has been created may go through process steps such as creation, packing, shipment, invoice-shipment, payment received and finally closing. Then, the order information may only be needed for analytical purposes, such as revenue in the last quarter, over the last year, etc. Therefore, the data of the order may be aging from fresh creation, frequent access while fulfillment is executed, until accessed only rarely in analytical purposes and ultimately, it may not be needed anymore.

Unfortunately, commercial databases today do not support the automatic identification and placement of data in appropriate storage media based on an age of data, which may be derived from access patterns.

In particular, some commercial databases track to a certain degree the last modification of a data either on record, page or an extended level. But, read access is not tracked at all. Thus, it cannot even be determined today if a certain portion of data is frequently accessed by read operations instead of data modification operations. Thus, all data need to stay on fast hard disks—or solid state disks—even if the data may only be read or not accessed at all. A concept of temporal aging is not supported at all.

Finally, data must comply with retention policies by legal regulations. This requirement must be taken care of by any autonomic solution for temporal aging as well.

Document US20080154994A1 discloses a method for data management for implementing or otherwise managing aged index data for a database. The categorization is based on business logic, such as a closed or open business process.

Document US20090210445A1 discloses a method for optimizing data access in a record-oriented relational database containing data sets having attributes. Attributes are assigned higher and lower priority classes depending on an access frequency. The access frequency is determined based on counting accesses to a certain data set over a period of time.

Thus, there may be a need for an improved method and an engine for handling storage pages in a database, in particular handling storage pages in order to improve the overall performance of a database system.

SUMMARY

Embodiments of the invention provide a computer implemented method, computer readable medium and system for performing an operation that includes copying a storage page of the storage pages from the storage component to a buffer pool controlled by the management component. The operation also includes monitoring which records of the storage page in the buffer pool are being accessed. The operation also includes setting information indicating access for each record accessed. The operation also includes determining whether to split the storage page into at least two resulting storage pages. The method also includes upon determining to split the storage page, writing the at least two resulting storage pages to the storage component at storage locations wherein the at least two resulting storage pages have different hierarchy levels.

It should be noted that a buffer pool may be located in a RAM (random access memory) of a computer and that the copying from the storage component to a buffer pool may denote a copying from a hard disk drive to a RAM. The term "accessed" in the feature monitoring which records are being accessed may, in particular, denote a read or modify command, wherein a modify command or modifying may denote any IUD command (insert, update, delete command).

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for embodiments may admit to other equally effective embodiments.

DETAILED DESCRIPTION

Figure 1:
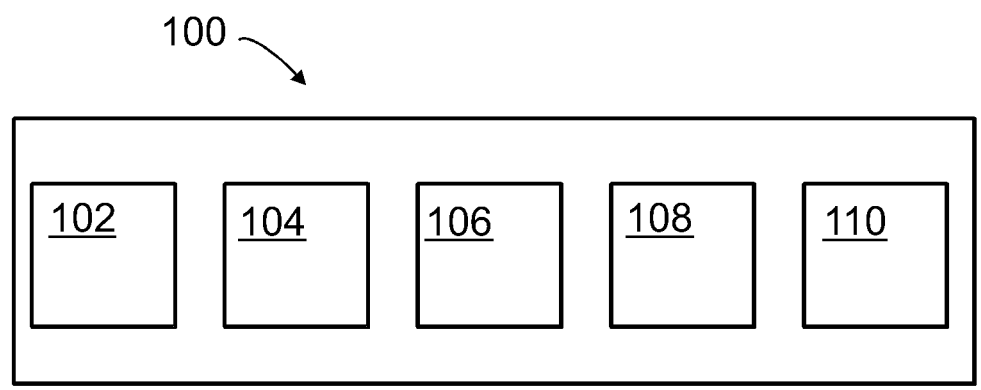
FIG. 1 is a block diagram of an embodiment of the inventive method.

Embodiments of the invention provide techniques for handling storage pages in a database system. One embodiment provides a computer implemented method configured to copy a storage page of the storage pages from the storage component to a buffer pool controlled by the management component. The method is further configured to monitor which records of the storage page in the buffer pool are being accessed. The method is further configured to set information indicating access for each record accessed. The method is further configured to determine whether to split the storage page into at least two resulting storage pages. The method is further configured to upon determining to split the storage page, write the at least two resulting storage pages to the storage component at storage locations wherein the at least two resulting storage pages have different hierarchy levels.

Advantageously, databases may be queried more quickly and with less energy usage at least in some cases, relative to alternative embodiments, such as alternative embodiments where a database does not track read access at all. In particular, the disclosure may better overall performance in handling storage, as compared to the alternative embodiments. Further, the disclosure may store data based on age and frequency of access of the storage pages, as compared to alternative embodiments which may merely databases track to a certain degree the last modification of a data either. In particular, the disclosure may handle storage pages in order to improve the overall performance of a database system.

Additional explanation regarding some features of embodiments should be given: The information indicating access for a record may be a record-last-accessed-flag. This information/flag may only exist and be stored in the buffer pool. The information/flag may be generated if an application may access the database, in particular a record stored in the database, and a specific storage page may be loaded from the storage component, in particular a hard disk, into the memory of a computer.

It should be understood that the splitting of the storage page may be performed, in particular, in order to store infrequently accessed database records to lower storage hierarchy levels with slower performance characteristics in the storage system. In particular, all accessed records may be stored as one storage page while all non-accessed records may be stored as another storage page.

The term writing something to a storage component may denote storing something in a storage component, e.g., a hard drive.

It should also be mentioned that the page split engine may be implemented as a driver as part of a management component of a database system.

The record-last-access-flag may track if a record was modified (insert, update or read). This flag may be tracked on a record level. It enables also the tracking of read operations in the database system. Otherwise—in conventional database systems—records accessed in a read-only mode would never age, which means that they would never be moved to a storage medium with a lower hierarchy level, i.e., with a slower access speed.

In the context of this application, the following conventions have been followed:

Database system—A database system may denote any database management system accessing data by so called storage pages. Storage pages may denote an area in a storage medium with a predefined size, i.e., a predefined amount of storage capacity. Typical capacities may be 4, 8, 16 or 32 kilobyte. However, embodiments may not necessarily be limited to any specific storage page size. A page may comprise one or more records, wherein the total number of records on a storage page may depend on a record length and whether or not the page is fully used.

Buffer pool—A buffer pool may denote a storage area in a RAM of a computer system. It may allow much faster access than stored information on a long-term storage such as a hard disk drive. While the information may be in the buffer pool, application, accessing the stored data may access the information from the buffer pool in form of a row or a record. The last two terms may be used as synonyms in the context of this application.

Accessing information—The term access or accessing information or data, in particular a record in a database, may denote a read access, an insert access, a modify access or an update access.

Split of a page—This expression may denote that a part of the information stored, in particular one or more records, from the original storage page may be stored on a new storage page, whereas another part, in particular one or more records, of the records may be stored on another new storage page. The pages may all have the same size. The new storage pages may be written to storage media with different access speed, i.e., in media with different hierarchy levels.

Hierarchy level—The term hierarchy level in the context of storing information may denote levels of different access speed. A buffer pool may be faster than a solid state disk, a local hard drive, a storage in a storage network or a tape storage.

The above-described method for handling storage pages in a database system offers some advantages.

The inventive method and engine may allow for a proactive, controlled and automatic identification of aged data and aging of data in a database, while keeping additional overhead low. This means that data which may not be accessed frequently may be stored on slower and cheaper storage systems with a lower hierarchy level. This may allow for a faster access of data very often accessed in the database system. As a result, the overall performance of the database may be increased. Additionally, expensive storage capacity may be reduced because only a small amount of data may be accessed frequently. Less frequently accessed data may be stored on slower storage media, which is normally much cheaper. Retention policies for data may also be complied with. Thus, a price/performance ratio of a database may be increased resulting in a much better economical value of a database system. Moreover, the operational costs of a database may be decreased because the aging process of data may be performed automatically. There may be no need to maintain non-accessed data on slower storage media manually. The advantages may be achieved by a record-level binary flag for pages read into the buffer pool. No additional complex main memory structures or flags for complete database tables may be required. The aging of data may not be affected by a system downtime because the aging process may be performed or may be started one a typical workload may appears on the database system. The approach may be active as soon as the database may be started.

In one embodiment, hierarchy levels are differentiated by having different data access speed. Faster and slower storage devices may be used with different characteristics as explained above.

In another embodiment of the method, the storage page with records having set the record-last-access-flag are written to the storage medium having a higher access speed than the storage page with records having not set record-last-access-flag. Any form of a read, insert, update or modify access may be seen as an access.

In again another embodiment of the method, the buffer pool is located in RAM of a computer system. Typically, the RAM—apart from a CPU cache memory—allows fastest access to any data in a computer system.

In yet another embodiment of the method, the storage component includes at least one storage medium out of the group consisting of a solid state disk, a local hard disk, a storage network and a storage tape. In particular, a primary storage may be a solid state disk or a hard disk. The other storage media may belong to other hierarchy levels. This may imply, in particular, that the management component of the database system may control storage on different hierarchy levels.

According to one embodiment of the method, the database system is a relational database system or a hierarchical database system. In particular, any database system that stores information on pages is suitable.

According to again another embodiment of the method, the method may include determining a record-count-per-page indicator. In particular, the record-count-per-page indicator may be activated for counting the records per storage page being loaded into a buffer pool. This counter may be used together with a threshold mechanism to determine whether to split a page or not.

In one embodiment of the method, the method may also include defining a split threshold. This split threshold may in particular be used in order to determine when to split a page. If for example an accessed/non-accessed ratio of records on a page is, e.g., below 50%, it may lead to an explosion of a total number of storage pages, which may only be filled with a couple of records each. A waste of costly database space would be the consequence. Half or partially filled storage pages may therefore slow down the performance of the database and should be avoided. The threshold may have a pre-determined value and may work in conjunction with a records-count-per-page indicator. The split threshold may be a percentage value or an absolute value. In case it is an absolute value, it may not exceed the record per page indicator minus one. If there may only be one record on a page, the page may not be split.

The split threshold may therefore be used to determine whether to split a page during a write-back command or not.

It should be mentioned that the problem of only partially full storage pages may be mitigated due to reorganization processes that consolidate storage pages again from time to time.

In addition to the flag discussed, there may be a dirty flag as explained below.

In another embodiment of the method, the writing the at least two resulting pages, in particular writing back from a buffer pool to a storage component may include setting a touched-flag and storing the touched-flag together with the pages. Such a touched-flag may be required in order to identify those pages that have been split, in particular, to identify pages that include un-accessed records. Without such a touched-flag, un-accessed pages would never age. However, a reorganization process (REORG) of the database system may use the touched-flag. If a page would not have been accessed between two REORGs—meaning that the touched-flag may not be set—the REORG process may move the respective page to a storage media with a lower hierarchy level. It may also be required that a REORG process finding a page with a touched-flag may reset the touched-flag.

According to yet another embodiment of the method, the writing the at least two resulting pages may also include setting a dirty-flag and storing the dirty-flag together with the resulting pages in the buffer pool. This flag may be used by the database system ensuring transactional consistency when removing a storage page from the buffer pool. If this flag may be set, it means that there may have been at least one modifying operation for the current page in the buffer pool. In this case only, the database system may be required to ensure that the page may be written back to a storage system, e.g., a hard disk to avoid data consistency issues. If the flag may not be set and the page may have to be removed from the buffer pool—for performance reasons—the page may not be written back to the hard disk improving performance, but in this case risking inconsistency.

In another embodiment, a database management system may include the page split engine, in particular as a component of a driver for handling storage pages.

Furthermore, a computer or computer system may include a page split engine, as described above, and referring to the method for handling storage pages in a database system. The page split engine may also be implemented as a component of a database system which may be part of a computer system.

It should be noted that embodiments may take the form of an entire hardware implementation, an entire software embodiment or an embodiment containing both, hardware and software elements. In one embodiment, the disclosure is implemented in software, which includes, but is not limited to, firmware, resident software and microcode.

In one embodiment, a data processing program for execution in a data processing system is provided comprising software code portions for performing the method, as described above, when the program is run on a data processing system. The data processing system may be a computer or computer system.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus or device.

The medium may be an electronic, magnetic, optical, electromagnetic, infrared or a semi-conductor system for a propagation medium. Examples of a computer-readable storage medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular between features of the method type claims, and features of the apparatus type claims, is considered as to be disclosed within this document.

The aspects defined above and further aspects of the present embodiment are apparent from the examples of embodiments to be described hereinafter and are explained with reference to the examples of embodiments, but to which the invention is not limited.

In the following, a detailed description of the figures will be given. All illustrations in the figures are schematic. Firstly, a block diagram of the inventive method for handling storage pages in a database system will be described. Afterwards, embodiments of the method and a page split engine will be described.

FIG. 1 is a block diagram of an embodiment of the inventive method 100 for handling storage pages in a database system. The database system may include a management component and a storage component. The storage component may include storage locations with different hierarchical levels, wherein each storage page of the storage pages may include a number of records. The method may include copying, 102, a storage page from the storage component to a buffer pool controlled by the management component, in particular from a hard disk to RAM, monitoring, 104, which records of the storage page in the buffer pool are being accessed, setting, 106, a record-last-access-flag for each record. In response to a write-back command concerning the storage page from the buffer pool to the storage component, determine, 108, based on the set record-last-access-flag, whether to split the storage page into at least two resulting storage pages. Thus, infrequently accessed database records may be stored at storage media with lower storage hierarchy levels and slower performance characteristics. Finally, if it is determined to split the page, writing, in particular storing, 110, the at least two resulting storage pages to the storage component at storage locations wherein the at least two resulting storage pages have different hierarchy levels.

Figure 2:
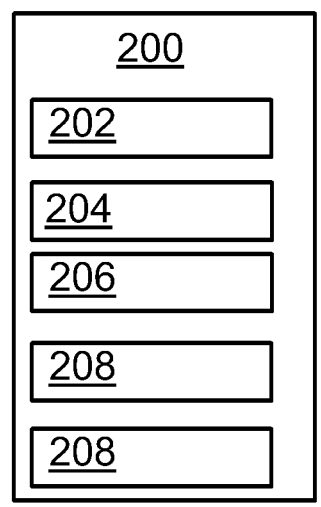
FIG. 2 is an organization of records on a storage page.

FIG. 2 is an illustration of an embodiment of a storage page 200. In or on the storage page, the information stored may be organized or stored in the form of records 202, 204, 206, 208, 210, wherein each record may have a fixed or variable length. Records may be identified by a key and may be accessed by the management component of the database system.

Figure 3:
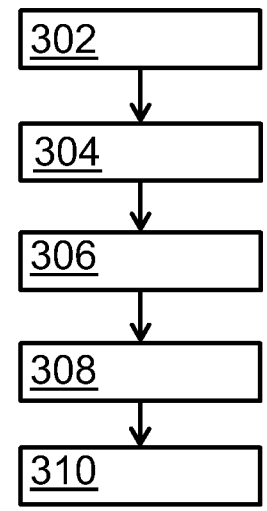
FIG. 3 is an illustration of different storage hierarchies.

FIG. 3 is an illustration of an embodiment of different hierarchy levels for storage systems, in particular those that may be controlled by page split engine. In a buffer pool 302, information, e.g., a record or a page, may be faster accessible than in solid state disk 304. Information in a solid state disk 304 may be faster accessible as from a local hard drive 306, a storage network 308 or a tape system 310. Additional hierarchy levels may be implemented within the hierarchy depending on an access speed.

Figure 4:
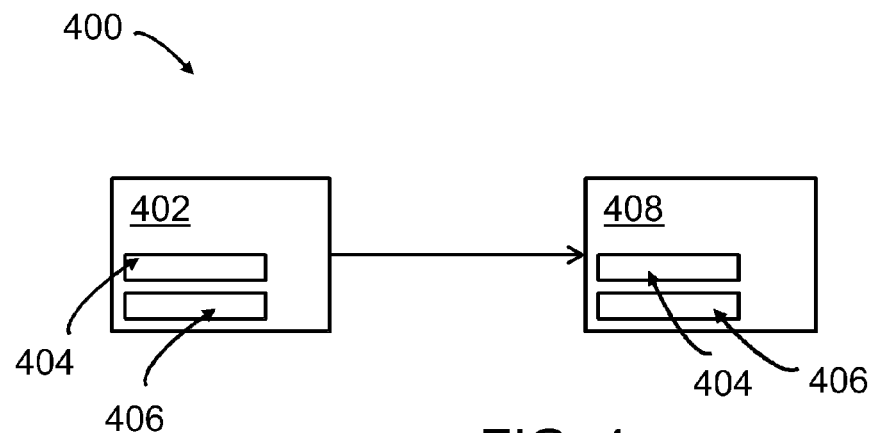
FIG. 4 is a block diagram of a simple write-back mechanism according to the state of the art.

FIG. 4 is a block diagram of a method 400 for a write-back of a storage page 402 from a buffer pool (not shown) to a storage component of a database according to conventional systems. The stored page 408, e.g., on a hard disk may have the same records 404, 406 as in the buffer pool 402. No page splitting may be performed.

Figure 5:
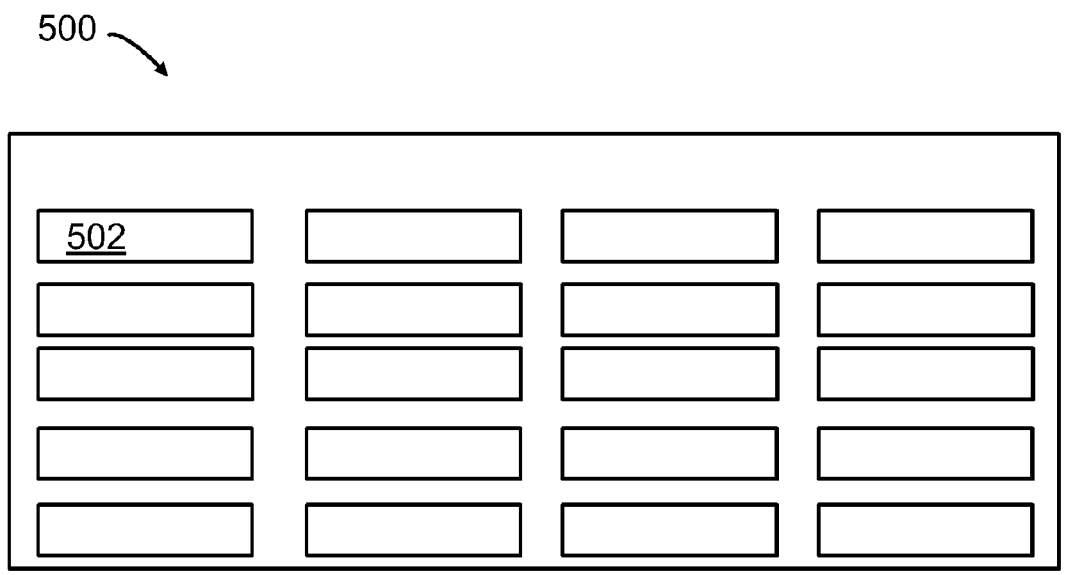
FIG. 5 is a block diagram of a buffer-pool comprising storage pages.

FIG. 5 is an illustration of an embodiment of block diagram of a buffer pool 500 with storage pages 502. All blocks in the buffer pool 500 in FIG. 5 may illustrate storage pages that have been read from a storage component. A flow of tasks that may be performed during an SQL query may be illustrated in FIG. 9 below.

Figure 6:
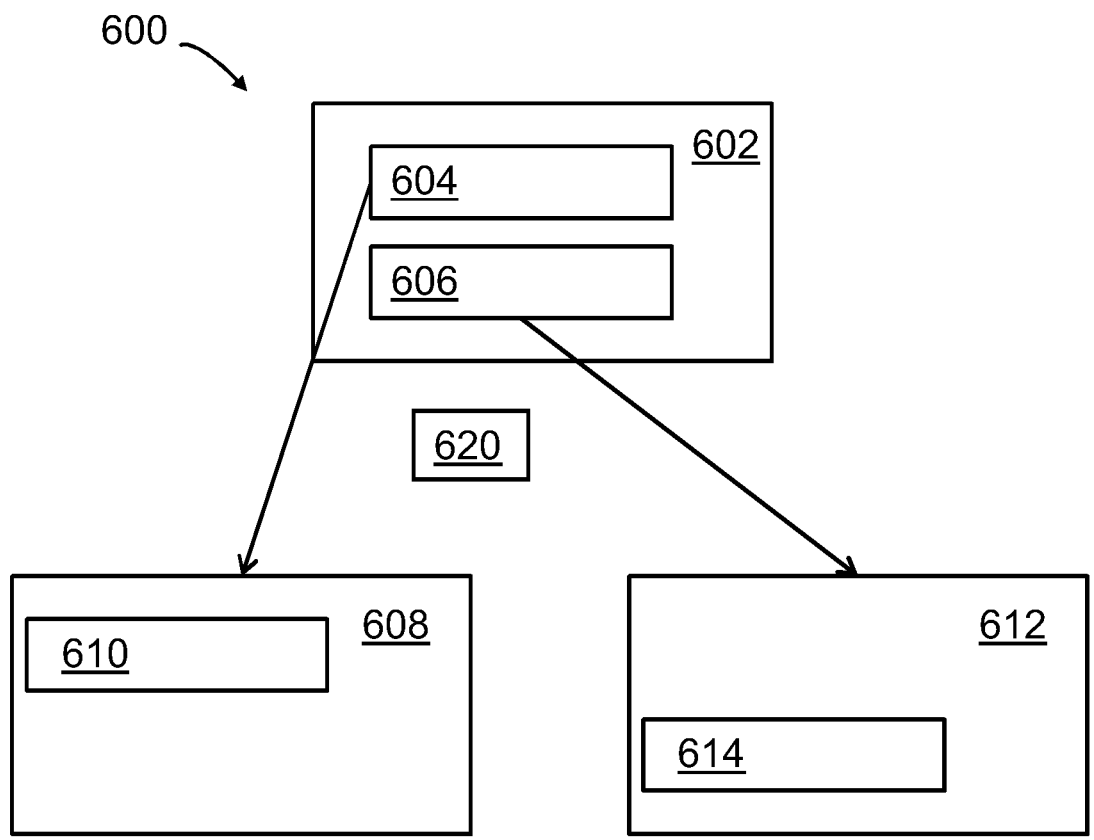
FIG. 6 is a block diagram of a page-split according to the inventive method.

FIG. 6 is an illustration of a block diagram of an embodiment of the inventive method 600 for handling storage pages in a database system. Storage page 602 in the buffer pool may symbolically include two records 604, 606. It may be assumed that record 604 may have been accessed during the time the storage page may be stored in the buffer pool, whereas record 606 may not have been accessed before a write back command may be issued by a management component 620 of a database system. It may be determined that record 604 has been accessed and record 606 may not have been accessed. During a write-back, the two records 604 and 606 may be written back onto different pages 608, 612, which may be stored using storage systems with different hierarchy levels. Thus, the resulting record 610, which may be equal to record 604, and the resulting record 614 may both be stored on different storage pages 608 and 612, which may be equal to record 606, with different hierarchy levels, i.e., on storage media with different access speed.

It is to mention that the two records 604, 606 may represent any number of records in the buffer pool. Embodiments may not be limited to just two records. The just two records are used for easier illustration of the method.

Figure 7:
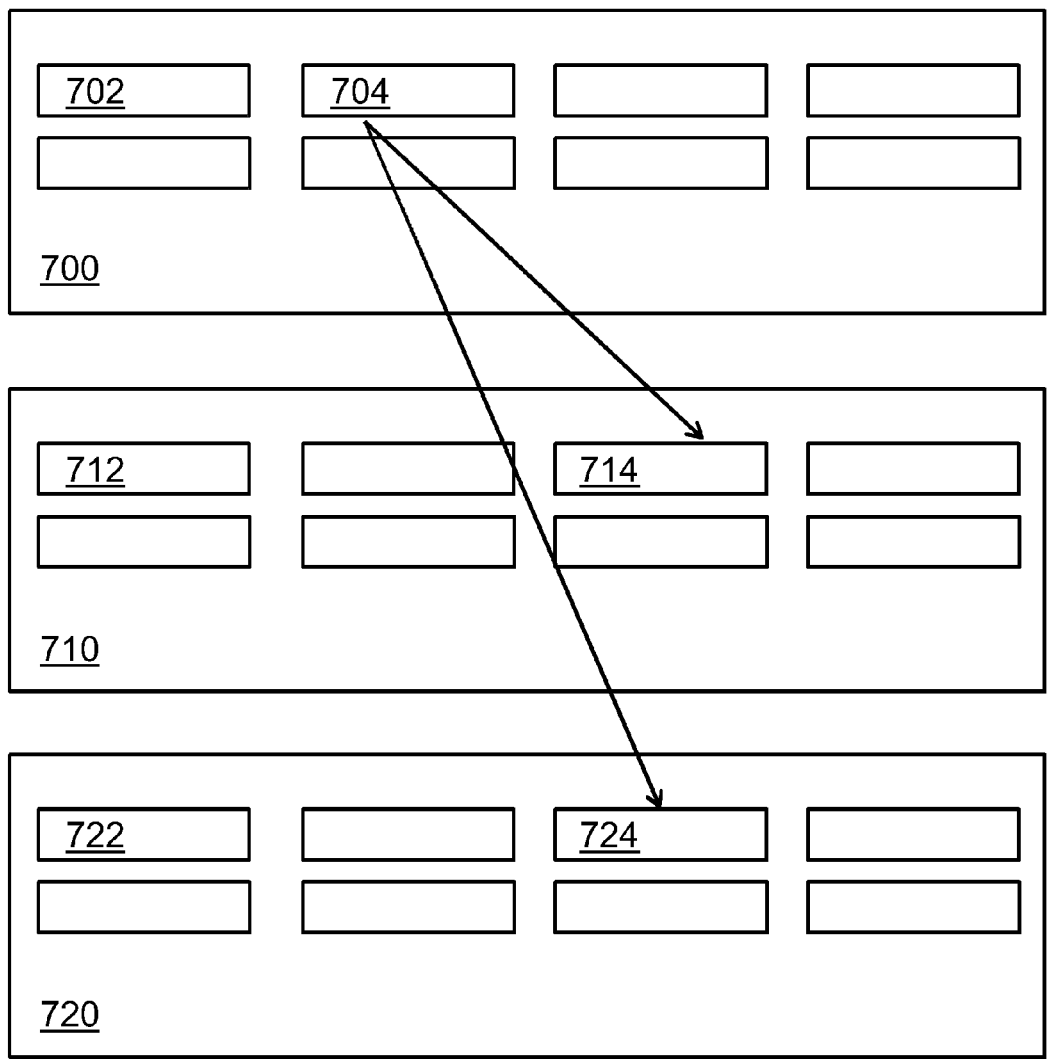
FIG. 7 is a block diagram of storing split pages from the buffer pool to different locations in storage components of a database.

FIG. 7 is another view on the embodiment shown in FIG. 6. A buffer pool 700 may include several storage pages 702, 704 and so on. The arrows may symbolize that the storage page 704 may be split—in the sense as explained above—into storage page 714 in a primary storage 710, e.g., a solid state disk or a hard disk, whereas storage page 724 may be written-back to a secondary storage 720, e.g., a slower hard disk, a storage network or a tape. Other storage pages, e.g., storage page 712 may be stored in the primary storage 710. Storage page 722 may be stored in the secondary storage 720 already.

Figure 8:
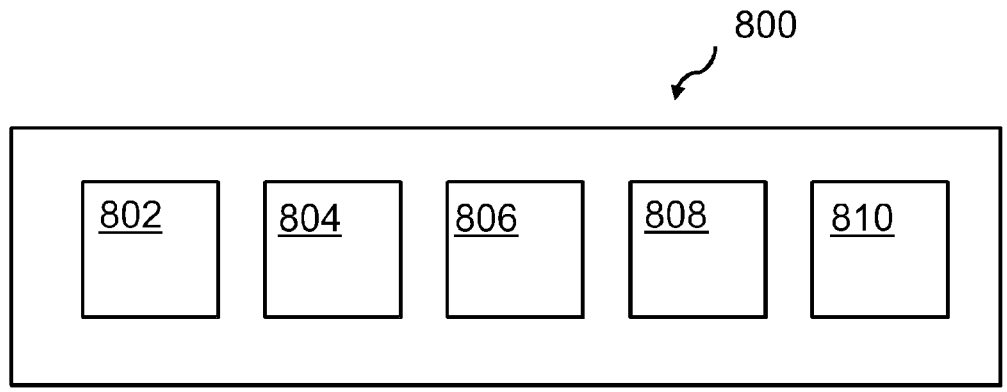
FIG. 8 is an illustration of a page split engine according to embodiments.

FIG. 8 is an illustration of an embodiment of an inventive page split engine 800, in particular a driver as part of the management component of a database system, for handling storage pages in the database system. The database system may include a management component and a storage component (not shown). The storage component may include storage locations with different hierarchical levels. Each storage page of the storage pages may include a number of records. The page split engine may include a copying unit 802 adapted for copying a storage page from the storage component to a buffer pool controlled by the management component, a monitoring unit 804 adapted for monitoring which records of the storage page in the buffer pool are being accessed, a setting unit 806 adapted for setting a record-last-access-flag for each record accessed. The page split engine may also include a determining unit 808 adapted for in response to a write-back command concerning the storage page from the buffer pool to the storage component, determine based on the set record-last-access-flag whether to split the storage page into at least two resulting storage pages. The page split engine may also include a writing unit 810 adapted for if it is determined to split the page, writing the at least two resulting storage pages to the storage component at storage locations, wherein the at least two resulting storage pages have different hierarchy levels.

Figure 9:
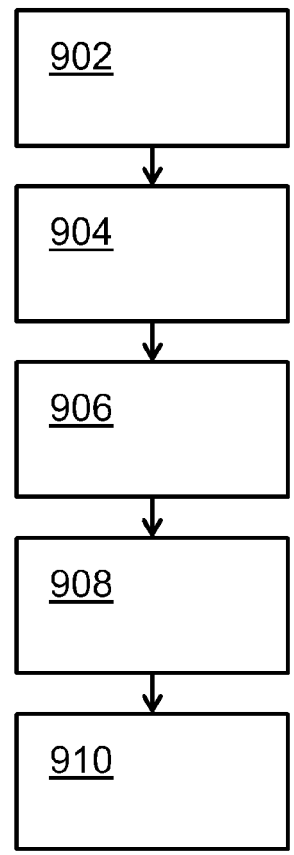
FIG. 9 is an illustration of a block diagram of a least recent used algorithm according to the state of the art.

FIG. 9 is an illustration of a flow of tasks during an SQL query: When the database system executing an SQL query may read one or multiple storage pages into the buffer pool, the record-last-access-flags for the records may be as follows:

Read indicator for a record: This may be set, 902, if and only if a page may be from a primary storage. For all subsequent hierarchy layers, the read-flag may not be set to avoid—if a table scan occurs—that all data may be upgraded to primary storage again.

Update/Delete indicator for record: This may be set, 904, for a record in a page independent from which storage hierarchy level the page may be coming from.

Insert indicators may only be set, 906, for pages in the buffer pool if a record may be inserted on a page which is not yet full. This indicator may be set independent from which location the page may originate.

A dirty flag (see below) for a page may be set, 908, if—and only if—for at least one record on the page the record-last-access-flag may have been set due to an insert, a delete or an update operation. It may not be set in case records got the record-last-access-flag for a read operation.

Also, as part of reading the page from the disk into a buffer pool, a touched-flag may be updated, 910, on the page used by a REORG algorithm. This is only necessary if the touched-flag may not yet have been set.

Figure 10:
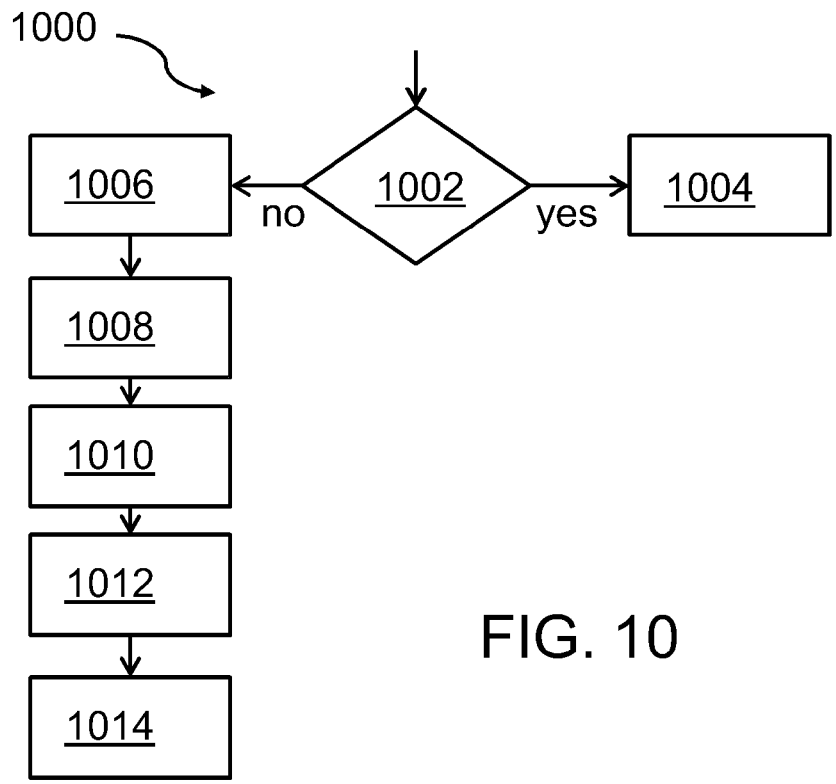
FIG. 10 is an illustration of a block diagram of a least recent used algorithm.

FIG. 10 is an illustration of a block diagram 1000, of how the buffer pool may be released of new pages, which may need to be read into the buffer pool and the buffer pool is already full (LRU=least recent used algorithm) according to the state of the art. Each page in the buffer pool may be time-stamped and a least recent used algorithm for a page p may be applied:

If page p may be in the buffer pool, 1002, then a variable LAST(p) may be set, 1004, to a current system time. Otherwise, the following steps may be performed: Setting a variable "min" to a value of "current time" plus 1, 1006. For all pages q in the buffer do, 1008, the following: If the value LAST(q) may be smaller than the variable "min" then a variable "victim" may be set to the value of "q", 1008, and the variable "min" may be set to the value of LAST(q). If "victim" may have set a dirty flag then write back ("flush"), 1010, this page to the primary storage. Read, 1012, storage page p into the buffer pool held by "the victim" and, 1014, the value of LAST(p) may be set to a current system time. A dirty flag may mean that the page may have been modified due to an insert, update or delete operation. The dirty flag may not identify read operations.

Now with the split operation based on record-last-access-flag (RLAF) flag on record level and a dirty flag on page level, one may need to consider the following four cases below. Generally speaking, the idea may be to evaluate the RLAF flags regarding split before evaluating the dirty page flag. In case of a split, the page may persist anyway—though in split pages. Only if the split condition may not be fulfilled, but the dirty flag may be set, still need a write-back to disk may still be required to avoid data consistency issue with lost changes. So, four cases may need to be reflected:

(a) RLAF flags may be set and split may be required—In this case, there may be not a need to consider the dirty flag because the original page may be split into two pages and persisted thus, there may be no risk of losing data.

RLAF flags may be set for read only operations and split condition may be fulfilled—In this case, the dirty flag would not have been set—but one still may persist to achieve aging with the read condition. This case may essentially be the same as case a) because the dirty flag also may play no role here.

RLAF flags may be set for at least one record due to a modifying operation and a split may not be required—In this case, the page dirty flag may be set as well and a writing of the page to disk may be required.

RLAF flags may be set for one or more records due to read operations and a split may not be required—In this case, the page dirty flag may not be set and the page may be removed directly from the buffer pool without any risk of losing a change since none may have occurred.

Figure 11:
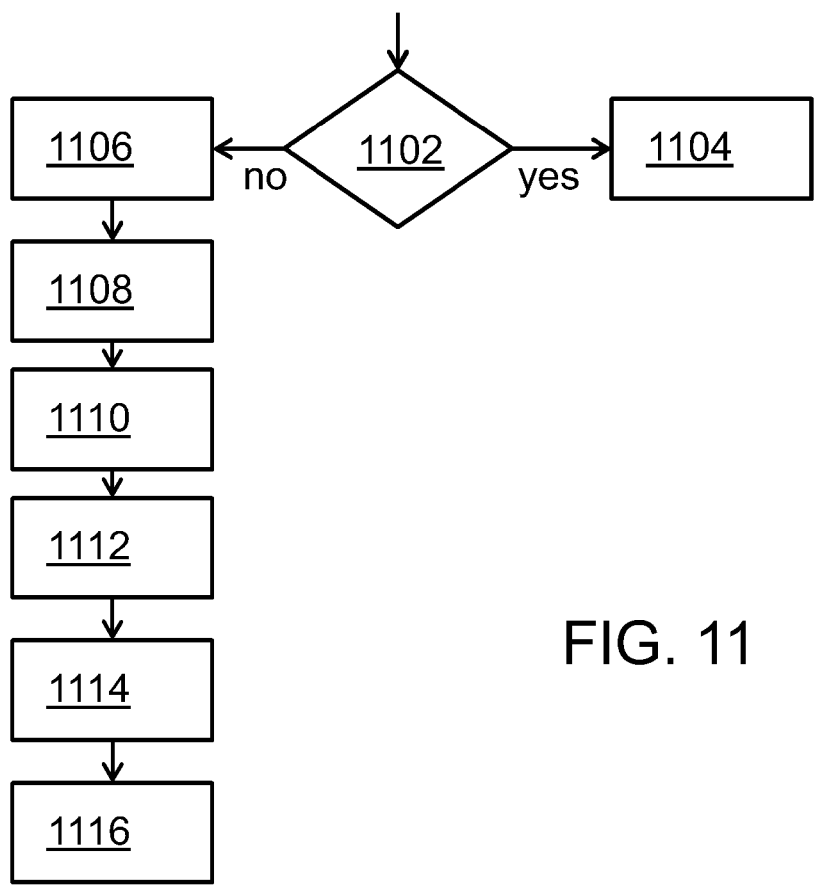
FIG. 11 is an illustration of a block diagram of a modified least recent used algorithm according to an embodiment.

Based on this, the following algorithm may be required. FIG. 11 is a block diagram of a modified least recent used algorithm for the case in which a storage page needs to be split before written back to the primary storage:

If p may be in the buffer pool, 1102, then a variable LAST(p) may be set, 1104, to a current system time. Otherwise, the following steps may be performed: Setting a variable "min" to a value of "current time" plus 1, 1106. For all pages q in the buffer do, 1006, the following: If the value LAST(q) may be smaller than the variable "min" then a variable "victim" may be set to the value of "q", 1108, and the variable "min" may be set to the value of LAST(q).

If the number of record-last-access-flags set may be smaller or equal the split threshold, the page may be split by (i) writing one page to the secondary storage: This page may contain all records for which the record-last-access-flags may not have been set. The rest of the page may be cleared and thus may be empty. This page may be a new page in the secondary storage. Secondly, the page may be split by (ii) writing one page to the primary storage: This page may contain all records for which the record-last-access-flags may be set and instead of the records that may have been written to the secondary storage an overflow record. This page may replace the original page. An overflow record pointer may point to the record written to the secondary storage and only requires a few bytes of storage for addressing the record in the secondary storage. This record may be required to maintain the ability to do index-based lookups. After the split, the indexes may still contain the location of the record in the primary storage. This level of indirection may be cleaned-up and be removed as soon as the index structures for the table may be re-organized. The index reorganization may then point to the location on the records on the secondary storage. The space for the overflow record may be released on the page in the primary storage. This all may be performed in block 1110.

In block 1112, it may be determined that a page split may not be required, but a page dirty flag may have been set so that the page may persist before the victim page may be removed. Block 1114 may represent to fetch page p into the buffer pool held by the victim page. And finally, block 1116 may represent that LAST(p) may be set to a current system time.

Figure 12:
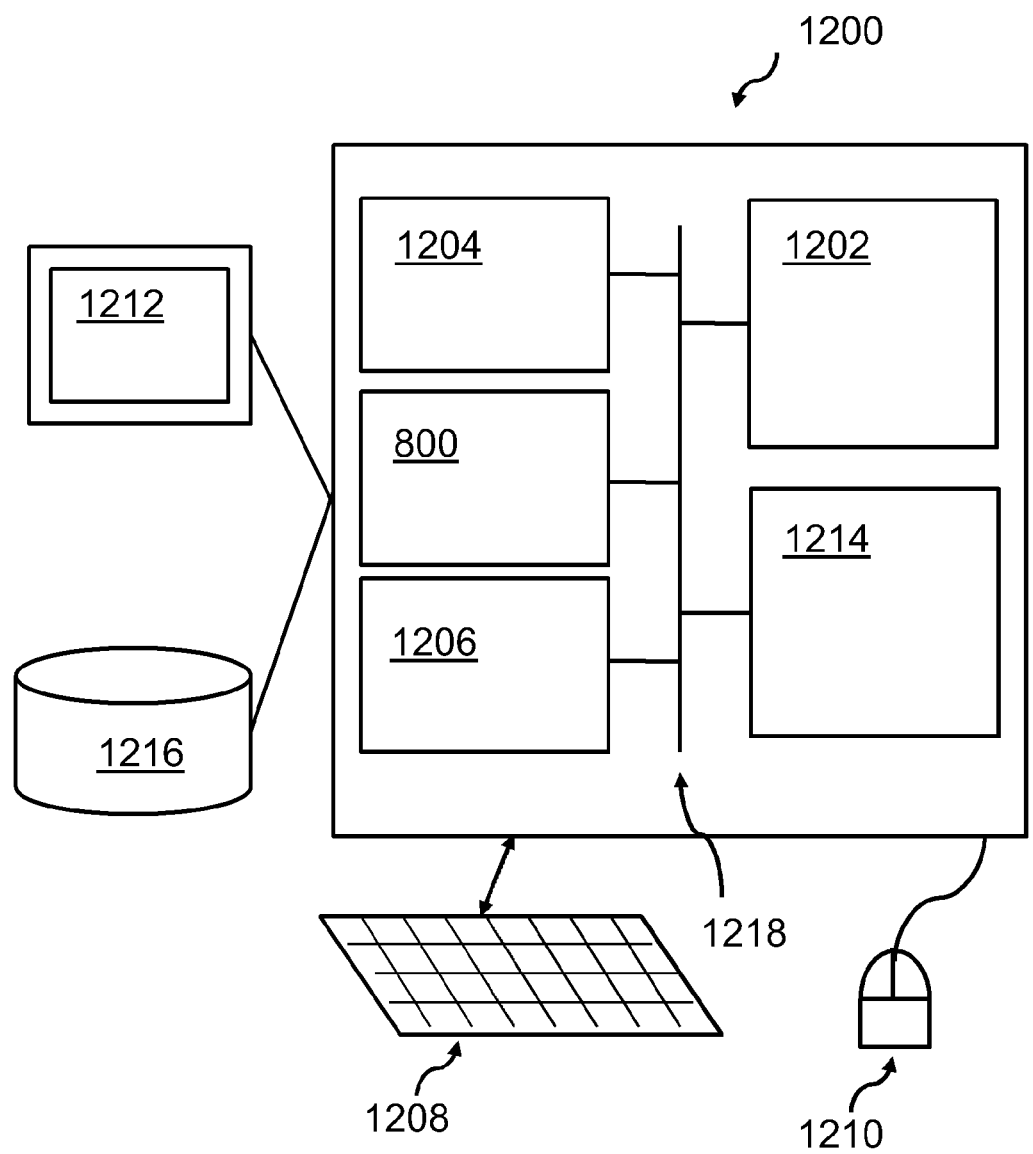
FIG. 12 is an illustration of a computer system including the inventive page split engine.

Embodiments of the invention may be implemented on virtually any type of computer, regardless of the platform being used suitable for storing and/or executing program code. For example, as shown in FIG. 12, a computer system 1200 may include one or more processor(s) 1202 with one or more cores per processor, associated memory elements 1204, an internal storage device 1206 (e.g., a hard disk, an optical drive such as a compact disk drive or digital video disk (DVD) drive, a flash memory stick, etc.), and numerous other elements and functionalities, typical of today's computers (not shown). The memory elements 1204 may include a main memory, e.g., a random access memory (RAM), employed during actual execution of the program code, and a cache memory, which provides temporary storage of at least some program code or data in order to reduce the number of times, code must be retrieved from external bulk storage 1216 for an execution. Elements inside the computer 1200 may be linked together by means of a bus system 1218 with corresponding adapters. Additionally, a page split engine 800 may be attached to the bus system 1218.

The computer system 1200 may also include input means, such as a keyboard 1208, a mouse 1210 or a microphone (not shown). Furthermore, the computer 1200, may include output means, such as a monitor 1212 [e.g., a liquid crystal display (LCD), a plasma display, a light emitting diode display (LED) or cathode ray tube (CRT) monitor]. The computer system 1200 may be connected to a network (e.g., a local area network (LAN), a wide area network (WAN), such as the Internet or any other similar type of network, including wireless networks via a network interface connection 1214. This may allow a coupling to other computer systems or a storage network or a tape drive. Those, skilled in the art will appreciate that many different types of computer systems exist, and the aforementioned input and output means may take other forms. Generally speaking, the computer system 1200 may include at least the minimal processing, input and/or output means, necessary to practice embodiments of the invention.

Further, those skilled in the art will appreciate that one or more elements of the aforementioned computer system 1200 may be located at a remote location and connected to the other elements over a network. Further, embodiments of the invention may be implemented on a distributed system having a plurality of nodes, where each portion of the embodiments may be located on a different node within the distributed system. In one embodiment of the invention, the node corresponds to a computer system. Alternatively, the node may correspond to a processor with associated physical memory. The node may alternatively correspond to a processor with shared memory and/or resources or a smartphone.

Further, software instructions to perform embodiments of the invention may be stored on a computer readable medium, such as a compact disk (CD), a diskette, a tape or any other computer readable storage device.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present embodiment, the database and storage pages may be stored in the cloud. The operation may also execute in the cloud. Doing so allows for handling storage pages in a database from any computing system attached to a network connected to the cloud (e.g., the Internet).

The flowchart and block diagrams in the Figures illustrate the architecture, functionality and operation of possible implementations of systems, methods and computer program products according to various embodiments of the present embodiment. In this regard, each block in the flowchart or block diagrams may represent a module, segment or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for handling storage pages in a database system, the database system comprising a management component and a storage component, the storage component comprising storage locations with different hierarchical levels, each storage page of the storage pages comprising a number of records, the method comprising:
   copying a storage page of the storage pages from the storage component to a buffer pool controlled by the management component;
   by operation of one or more computer processors, monitoring which records of the storage page in the buffer pool are being accessed;
   setting information indicating access for each record accessed;
   defining a split threshold based at least on a number of distinct records of the storage page that are accessed after the storage page is copied into the buffer pool, relative to the number of records of the storage page;
   determining, based on the information indicating access and the split threshold, and in response to a write-back command concerning the storage page from the buffer pool to the storage component, whether to split the storage page into at least two resulting storage pages; and
   upon determining to split the storage page, writing the at least two resulting storage pages to the storage component at storage locations wherein the at least two resulting storage pages have different hierarchy levels.

2. The method of claim 1, wherein hierarchy levels are differentiated by having different data access speed.

3. The method of claim 1, wherein the storage page with records having the information indicating access are written to the storage medium having a higher access speed than the page with records not having information indicating access.

4. The method of claim 1, wherein the buffer pool is located in random access memory of a computer system and wherein the storage component comprises at least one storage medium out of the group consisting of a solid state disk, a local hard disk, a storage network, and a storage tape.

5. The method of claim 1, wherein the information indicating access comprises a record-last-access-flag.

6. The method of claim 1, wherein the method further comprises:
   determining a record-count-per-page indicator.

7. The method of claim 1, wherein writing the at least two resulting pages further comprises at least one of:
   setting a touched-flag and storing the touched-flag together with the pages; and
   setting a dirty-flag and storing the dirty-flag together with the resulting storage pages.

8. A system for handling storage pages in a database system, the database system comprising a management component and a storage component, the storage component comprising storage locations with different hierarchical levels, each storage page of the storage pages comprising a number of records, the system comprising:
   one or more computer processors;
   a page split engine configured to execute on the one or more computer processors and comprising:
      a copying unit configured to copy a storage page of the storage pages from the storage component to a buffer pool controlled by the management component;
      a monitoring unit configured to monitor which records of the storage page in the buffer pool are being accessed;
      a setting unit adapted for setting information indicating access for each record accessed;
      a thresholding unit configured to define a split threshold based at least on a number of distinct records of the storage page that are accessed after the storage page is copied into the buffer pool, relative to the number of records of the storage page;
      a determining unit configured to determine, based on the information indicating access and the split threshold, and in response to a write-back command concerning the storage page from the buffer pool to the storage component, whether to split the storage page into at least two resulting storage pages; and
      a writing unit configured to, upon determining to split the storage page, write the at least two resulting storage pages to the storage component at storage locations, wherein the at least two resulting storage pages have different hierarchy levels.

9. The system of claim 8, wherein hierarchy levels are differentiated by having different data access speed.

10. The system of claim 8, wherein the storage page with records having the information indicating access are written to the storage medium having a higher access speed than the page with records not having information indicating access.

11. The system of claim 8, wherein the buffer pool is located in random access memory of a computer system and wherein the storage component comprises at least one storage medium out of the group consisting of a solid state disk, a local hard disk, a storage network, and a storage tape.

12. The system of claim 8, wherein the information indicating access comprises a record-last-access-flag.

13. The system of claim 8, wherein the determining unit is further configured to determine a record-count-per-page indicator.

14. The system of claim 8, wherein writing the at least two resulting pages further comprises at least one of:
   setting a touched-flag and storing the touched-flag together with the pages; and
   setting a dirty-flag and storing the dirty-flag together with the resulting storage pages.

15. A computer program product, comprising:
   a computer-readable memory medium having computer-readable program code embodied therewith, the computer-readable program code comprising:
      computer-readable program code configured to copy a storage page of the storage pages from the storage component to a buffer pool controlled by the management component;
      computer-readable program code configured to monitor which records of the storage page in the buffer pool are being accessed;
      computer-readable program code configured to set information indicating access for each record accessed;
      computer-readable program code configured to define a split threshold based at least on a number of distinct records of the storage page that are accessed after the storage page is copied into the buffer pool, relative to the number of records of the storage page;
      computer-readable program code configured to determine, based on the information indicating access and the split threshold, and in response to a write-back command concerning the storage page from the buffer pool to the storage component, whether to split the storage page into at least two resulting storage pages; and
      computer-readable program code configured to upon determining to split the storage page, writing the at least two resulting storage pages to the storage component at storage locations wherein the at least two resulting storage pages have different hierarchy levels.

16. The computer readable memory of claim 15, wherein hierarchy levels are differentiated by having different data access speed.

17. The computer readable memory of claim 15, wherein the storage page with records having the information indicating access are written to the storage medium having a higher access speed than the page with records not having information indicating access.

18. The computer readable memory of claim 15, wherein the buffer pool is located in random access memory of a computer system and wherein the storage component comprises at least one storage medium out of the group consisting of a solid state disk, a local hard disk, a storage network, and a storage tape.

19. The computer readable memory of claim 15, wherein the information indicating access comprises a record-last-access-flag.

20. The computer readable memory of claim 15, wherein the computer-readable program code further comprises:
   computer-readable program code configured to determine a record-count-per-page indicator.

* * * * *